Dec. 30, 1941.　　　A. F. POTT　　　2,268,166
CARRIAGE SHIFT CONTROL MECHANISM
Original Filed Sept. 23, 1931　　6 Sheets-Sheet 1

Fig. 1

Dec. 30, 1941. A. F. POTT 2,268,166
CARRIAGE SHIFT CONTROL MECHANISM
Original Filed Sept. 23, 1931 6 Sheets-Sheet 4

Dec. 30, 1941.  A. F. POTT  2,268,166
CARRIAGE SHIFT CONTROL MECHANISM
Original Filed Sept. 23, 1931  6 Sheets-Sheet 5

A. F. Pott
INVENTOR

By Glascock Downing Sebold
ATTYS

Dec. 30, 1941.  A. F. POTT  2,268,166
CARRIAGE SHIFT CONTROL MECHANISM
Original Filed Sept. 23, 1931  6 Sheets-Sheet 6

Patented Dec. 30, 1941

2,268,166

UNITED STATES PATENT OFFICE 2,268,166

CARRIAGE SHIFT CONTROL MECHANISM

August Friedrich Pott, Zella-Mehlis, Germany, assignor to Mercedes Buromaschinen-Werke Aktiengesellschaft, Zella-Mehlis, Thuringia, Germany Original application September 23, 1931, Serial No. 564,643. Divided and this application June 10, 1937, Serial No. 147,587. In Germany October 2, 1930

5 Claims. (Cl. 235—63)

My invention relates to improvements in carriage shift control mechanism of the type exemplified in my co-pending application for U. S. Letters Patent Serial No. 564,643 filed September 23, 1931, and of which the present application is a division.

The primary object of my invention is the provision of an efficient motor drive for the carriages of such machines embodying simplified drive controlling means rendered effective by carriage advancing and retracting keys, to drive the carriage in opposite directions respectively and automatically conditioned under control of the carriage to reverse the direction of the drive at the end of the carriage movement in either direction, together with means automatically operative in the limit of movement of the carriage in either direction to positively return whichever key is held depressed and with a repulsor effect exerted in opposition to pressure exerted on the key by the operator.

Other and subordinate objects will presently appear when the following description and claims are read with reference to the drawings accompanying and forming part of this specification.

The carriage

In the type of machine with which my invention is more particularly concerned to wit, the Mercedes Euclid, the usual carriage C supporting the result register or accumulator A, and the revolutions counter R. C., is mounted, in a manner well understood, for step by step advance and retraction transversely of the machine and also for rearward tilting movement. Advance movement is from right to left as will be understood.

The tilting movement is unimportant to the present invention and is merely mentioned for the purpose of identification of said carriage.

The carriage drive

A motor 1, suitably mounted on the rear frame 2 of the machine, is operatively connected by a worm 3 and worm gear 4 to a main drive shaft 5 journaled in any suitable manner in said frame and rotating in the direction of the arrow (Figs. 3 to 5 and 16).

On the drive shaft 5 is a carriage shift clutch 86 (Figs. 3, 4, 5) of the single revolution type comprising a pair of circular housing members 86ª, 86ᵇ, a trip pawl 88 pivoted therebetween for engagement with a ratchet tooth member 90 fast on said shaft, a spring 87 tensioning said pawl for such engagement, and a clutch tripping dog 84 fast on a clutch control rock shaft 25 suitably journalled in the machine frame 2 for movement to swing said dog 84 in opposite directions into and out of tripping relation to said pawl respectively. In its tripping relation dog 84 cooperates with a tooth 85 on said pawl 88 as will be understood.

The carriage clutch 86 is designed to be operatively connected to the usual carriage shift propelling rack 128 through the medium of reverse gearing (Fig. 7) comprising a pin gear 110 meshing with said rack 128 and fast on a suitably journalled sleeve 122, a pair of opposed gears 61, 62 loose on said sleeve the former meshing with a gear 109 fast on clutch member 86ª and the latter meshing with an idler gear 62ª driven by the gear 109, a draw key 60 settable in said sleeve and having a key lug 59, and key ways 122ª, 143 and 61ª in said sleeve and gears 62, 61, respectively, whereby in different set positions of said draw key one or the other of said gears 61, 62 may be coupled to said sleeve and said gearing conditioned for advance or retraction of the carriage C. As will be understood, when the gear 61 is coupled with the gear 109, and when the gear 62 is coupled with the gear 62ª they are rotated in opposite directions relative to each other. The gears 62 and 61 are left and right hand driving gears, respectively, or in other words carriage advancing and retracting gears respectively. The ratio of the drive between the gears 109 and 61, 62 is two to one for a purpose presently seen.

Drive controlling means

In conjunction with the foregoing key operated drive controlling means are provided for setting the draw key 60 and conditioning the reverse gearing as follows:

At one side of the key board K (Figs. 1, 13) are carriage advancing and retracting, or left and right hand carriage shifting keys 7 and 8, respectively. Surmounting a pair of key levers 73 and 12, respectively, pivoted, as at 13, side by side on a fixed shaft 14 for depression through a guide plate 16 which limits their upward movement.

Figure 1:
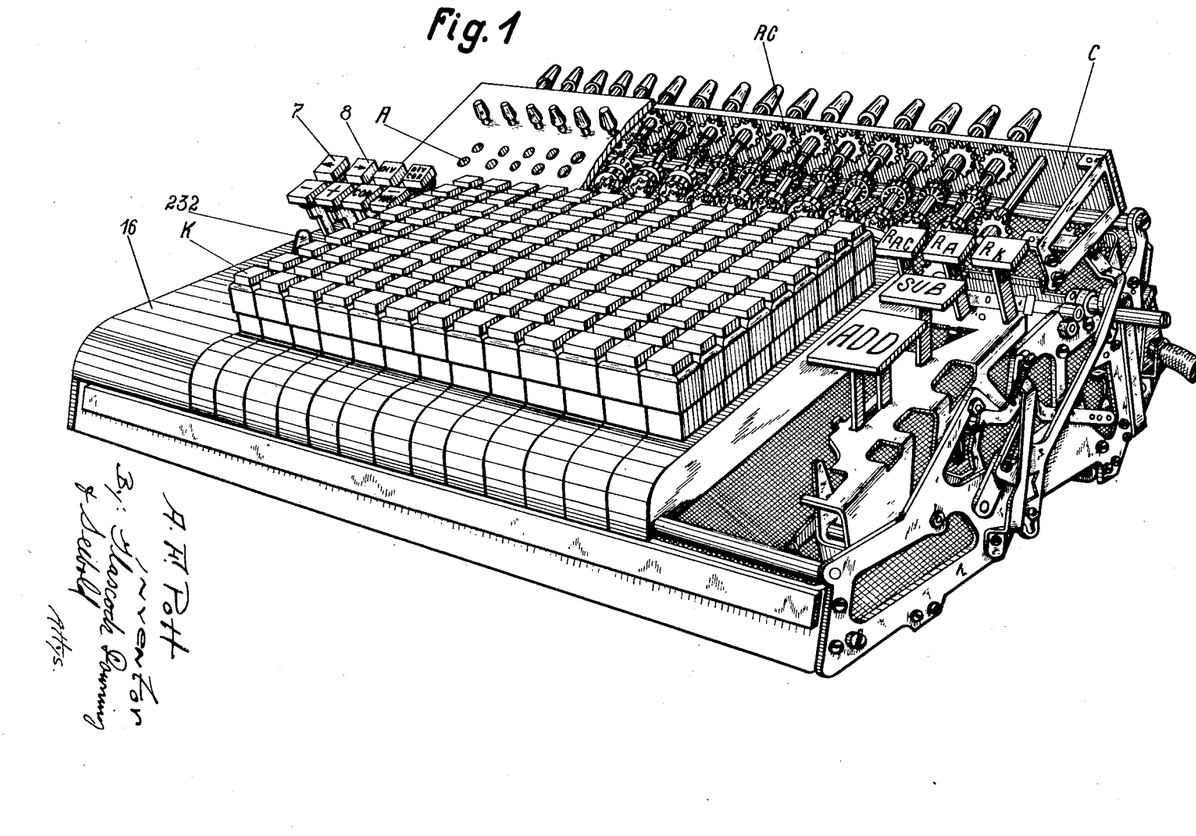
Figure 1 is a view in perspective of a machine equipped according to my invention, the cover plate being partly removed to show the interior mechanism.
Figure 11:
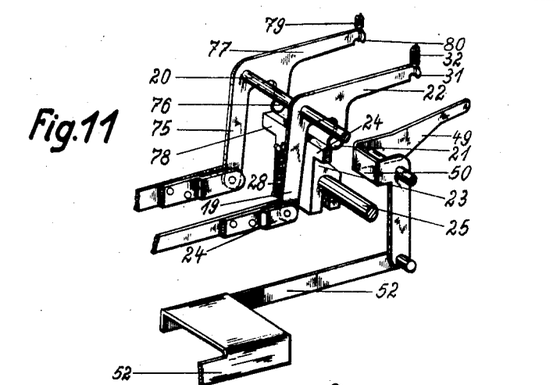
Fig. 11 is a view in perspective of a clutch control shaft, operating connections between the carriage advancing and retracting keys and said shaft and the reverse gearing and also operating connections between the multiplication controlling lever and said gearing.

The pair of key levers 73 and 12 are operatively connected to a pair of bell cranks 75 and 19, respectively (Figs. 9 and 11) pivotally mounted side by side, on a suitably fixed transverse shaft 20 to each provide a horizontally extending arm 77, in the case of bell crank 75, and 22 in the case of bell crank 19. A pair of links 74 and 18 operatively connect said key levers 73 and 12 to the bell cranks 75 and 19, respectively, so that depression of said levers correspondingly moves the arms 77 and 22 for a purpose presently clear. A pair of coil springs 79 and 82 secured to said arms 77 and 22, as at 80 and 81, respectively, tension said arms and the key levers 73 and 12 against depression from normal position as established by contact of the levers 73 and 12 with guide plate 16 (Fig. 1).

The bell crank arms 77, 22 are each provided with a depending lug 76 and 21 normally bearing against opposed arms 78 and 24 of a rectangular crank member 23 fast upon the before mentioned clutch control shaft 25 so that upon depression of either key 7 or 8 said shaft will be rocked by the related bell crank 75 or 19, as the case may be, in a direction to swing the clutch tripping dog 84 into non-tripping position relative to the carriage clutch trip pawl 88 and permit engagement of the carriage shift clutch 86 to follow in a manner which will be understood.

On the main drive shaft 5 a cam 107a (Fig. 16) formed with conically extending circumference, is non-rotatably mounted, which cam acts on arm 105a of a two-armed contact lever 105. The arm 105a in its rest position lies on the conical circumference 106 of the cam 107a and is held in this position by means of a spring 105b attached at one end to a lug 105c of the arm 105a of the lever 105, and at its other end to a nose 101a of a lever 101. The lever 101 which is swingably mounted on the shaft 101b has a forwardly and an upwardly projecting arm 99 and 99a, respectively. A spring 145 attached at one end to a pin of the lever arm 99 and at its other end to the machine frame in any suitable manner, acts on the lever 101 in the clockwise direction round the shaft 25. Through contact of the roller 99b of the arm 99, of the lever 101 with the face 156a of the lever 156 the normal position is determined. On the upwardly projecting arm 99a of the lever 101 the two-armed lever 105, previously mentioned is swingably mounted. This acts with the downwardly projecting limb 148 on a contact carrier 108. On the free end of this carrier a contact pin 108a is fixed, which coacts with a contact pin 92 fastened to an angle piece 91. On the previously said rocking movement of the shaft 25 the lever 156 participates, whereby the face 156a of the lever 156 acts on the roller 99b of the lever 101 and this swings against the action of the spring 145 round the shaft 101b. Hereby the contact lever 105 is displaced in the anti-clockwise direction and the arm 105a of the lever 105 which normally through the action of the spring 105b is brought into contact with the conical periphery 106 of the cam 107a, slips off from the same. The contact lever 105 with its end 148 can now under the action of the spring 105b, swing in the anti-clockwise direction, whereby under the action of the contact spring 108, the motor contact 92 and 108a is closed. The motor 1 now commences to run in the clockwise direction and rotates the drive shaft 5 by the worm 3 disposed on the motor shaft through the worm wheel 4 in the anti-clockwise direction. If the face 156a of the lever 156 has released the roller 99b, also the parts 99, 101, 105 return into their rest position under the action of the spring 145, as soon as the lever 105 at a suitable moment slides on the cam 107a at 146a. When this is effected the cam 107a swings the lever 105 in the clockwise direction, whereby the contact spring 108 is pressed together and the contact 92—108a is opened, so that the motor 1 again comes to rest. If the curve 146 has swung out the lever 105 completely, it slides under the action of the spring 105b again on to the conical periphery 106 of the cam 107a.

Intermediate the bell cranks 75 and 19 is a rocking unit for setting the draw key 60 and returning the keys 7 and 8 to normal position said unit comprising a draw key setting lever 41 (Figs. 9, 11), a key controlled lever 35 for operating said lever 41 and a carriage controlled lever 47 for operating both levers 41 and 35. The levers 41, 35 and 47 are swingably mounted side by side in pendent position upon a common horizontal pivot 36 (Fig. 2) fixed on the rear of the machine.

The key controlled lever 35 comprises a pair of upper laterally extending arms 161, 111 adapted to underlie the bell crank arms 77 and 22, respectively, a pendent intermediate yoke part 38, and a pair of lower laterally extending lugs 39 and 40 embracing the lower end of the setting lever 41 whereby it is operatively connected to the last named lever 41.

The carriage controlled lever 47 comprises laterally extending arms 120, 114, an upstanding arm 265, and a yoke part 48 at one end of the arm 114 all for a purpose presently explained.

The setting lever 41 is slotted, as as 42, to permit relative compensating movement of the lever 41 relative to the other levers 35 and 47 for a purpose presently seen and comprises a pair of opposed laterally extending arms 44, 43 terminating in a pair of opposed lugs 46 and 45 underlying the arms 120, 114 of the lever 47, respectively. A tension spring 53 connected to the arm 265 of the carriage controlled lever 47 and to a pin 54 on the setting lever 41 urges the latter upwardly so that the lugs 46 and 45 normally bear against the arms 120, 114 of said lever 47 whereby the latter is operatively connected to the setting lever 41 for compensating yielding movement relative thereto for a purpose presently explained.

The draw key setting lever 41 is operatively connected to said key by means of a link 55 and a right angled yoke 56 including a horizontal bifurcated setting arm 121 engaging a groove 255 in said key, said yoke being pivoted, as at points 57, 58, and the link being suitably connected thereto, the arrangement being such that swinging movement of said setting lever 41 in opposite directions couples the gears 61 and 62, respectively, to the sleeve 122 thereby conditioning the described reverse gearing for advance or retraction of the carriage C.

The carriage controlled lever 47 has operatively connected thereto, as by the slot and pin 141 and 63, one arm 64 of a suitably pivoted carriage operated bell crank 66 the other arm 142 of which extends into the path of travel of a pair of right and left hand tappets 67 and 69, respectively, fast on the carriage C.

Normally the carriage controlled lever 47, and hence the entire described unit is swung in a direction to couple the left drive gear 62 to the sleeve 122 and thereby condition the described reverse gearing for left hand drive of the carriage C. This is accomplished by means of a tension spring 70 connected to the carriage operated bell crank, as at 71, and to a fixed part of the machine. In this normal position, the described parts including the unit are in an opposite position to that shown in Figs. 2 and 9, in which position the lever and the unit are operated to couple the right drive gear 61 to the sleeve 122 for operating the described reverse gearing for right hand drive of the carriage C.

On the lever 35 and before mentioned crank member 23 of clutch control shaft 25 are coacting locking elements comprising a lug 117 depending from the upper edge of the yoke part 38 of said lever and a right angled locking dog 26 pivoted on said shaft in a slot 30 in said member 23 to project into said yoke part 38, below said lug. A stop arm 30a on the dog 26 coacting with the bottom of the slot 30 limits pivotal movement of said dog in one direction. A suitably connected spring 29 tensions the dog 26 against movement in the opposite direction. In the normal position of the clutch control shaft 25 and clutch tripping dog 88, said tripping dog 88, said member 23 and the described unit are in such positions that the locking dog 26 of the member 23 is located on the left hand side of the lug 117 and on the level of the under edge of the lug 117.

*Operation of drive controlling means*

The manner in which depression of the carriage advancing and retracting keys 7 and 8 effects engagement of the carriage shift clutch 86 and renders the motor effective has previously been described. The operation of the remaining parts of the drive controlling means will now be described and first with reference to operations following upon depression of the right hand drive or carriage retracting key 8.

Figure 2:
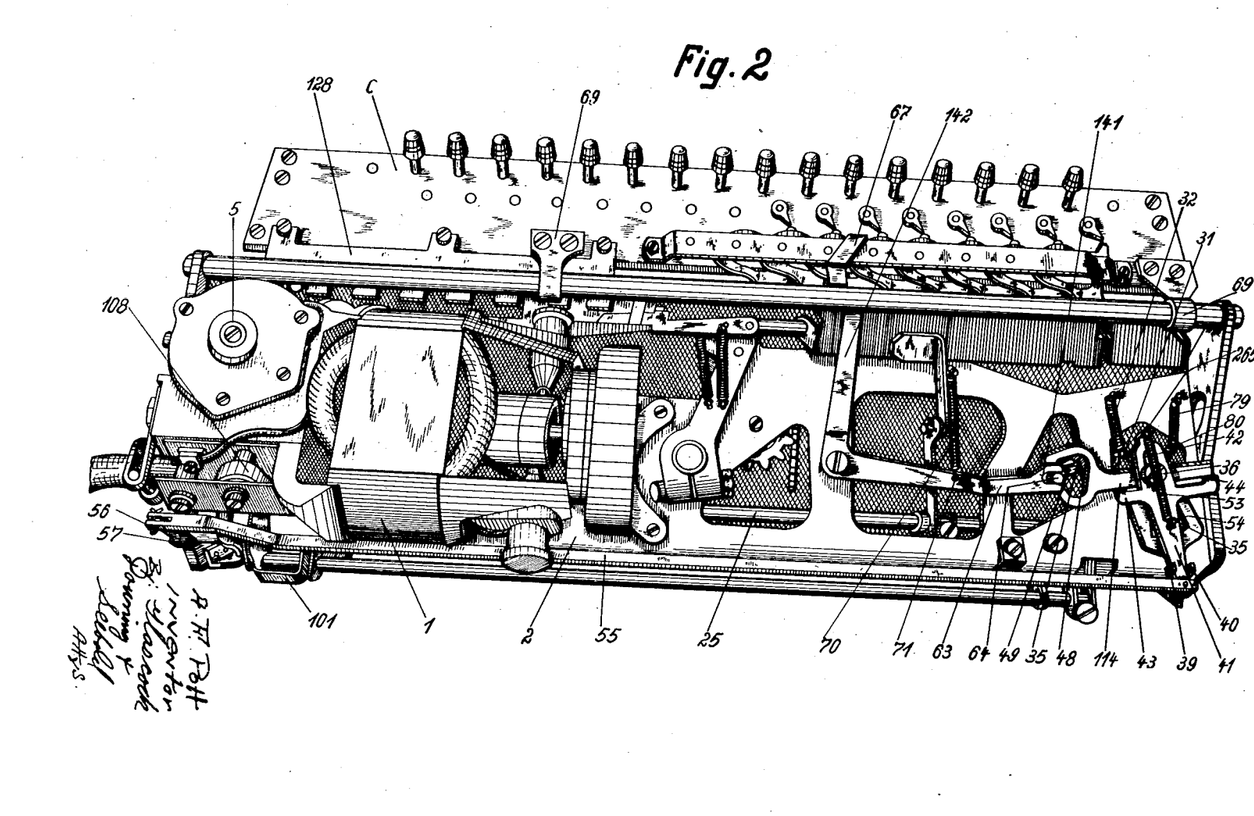
Fig. 2 is a view in perspective looking at the rear of the machine, the cover plate being removed.
Figure 3:
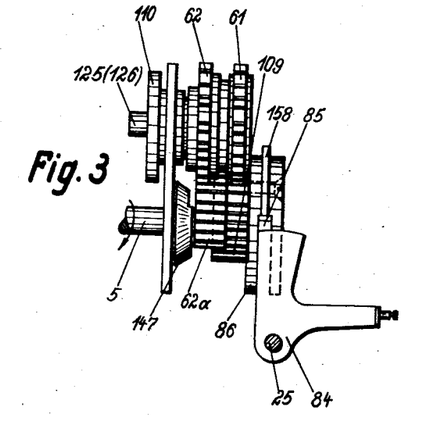
Fig. 3 is a fragmentary view partly in section and partly in side elevation of the main drive shaft, a carriage clutch thereon and reverse gearing between said clutch and the carriage.
Figure 4:
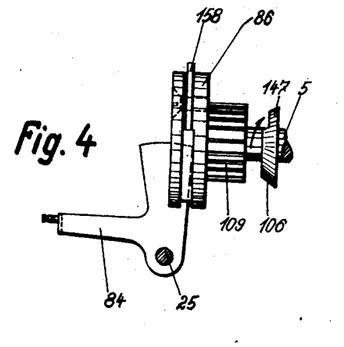
Fig. 4 is a similar view looking in the reverse direction.
Figures 5, 6, 7, 8:
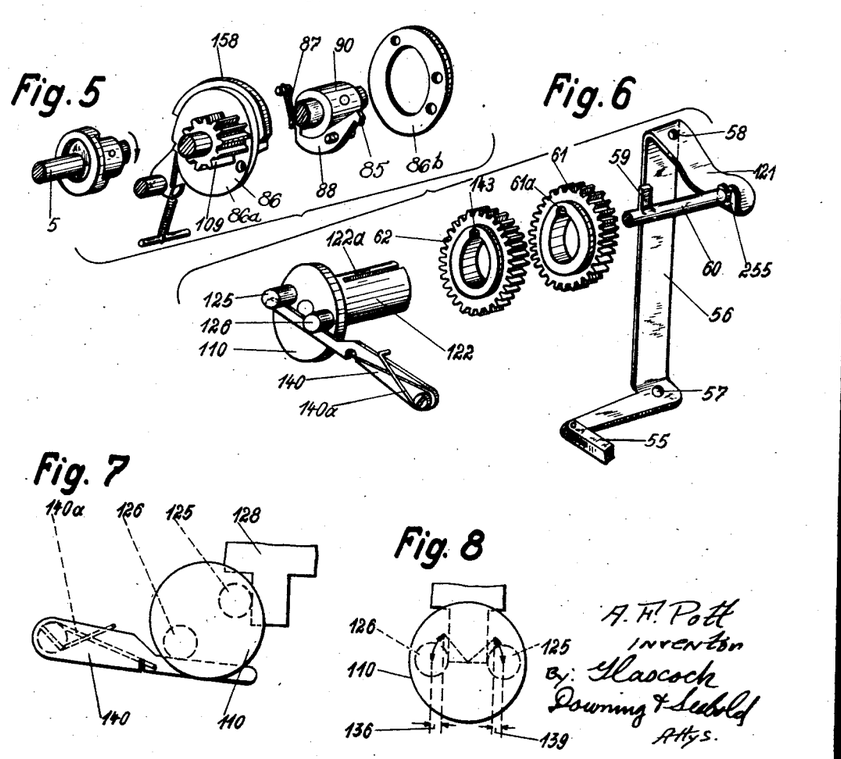
Fig. 5 is a view in perspective of the main drive shaft and the before mentioned clutch the parts being shown disassembled for clearness of illustration.
Fig. 6 is a view in perspective of parts of the reverse gearing for the carriage drive the parts being shown disassembled.
Fig. 7 is a view in side elevation of a rack and pin gear forming part of the carriage driving mechanism.
Fig. 8 is a similar view illustrating the operation of said rack and gear.
Figure 9:
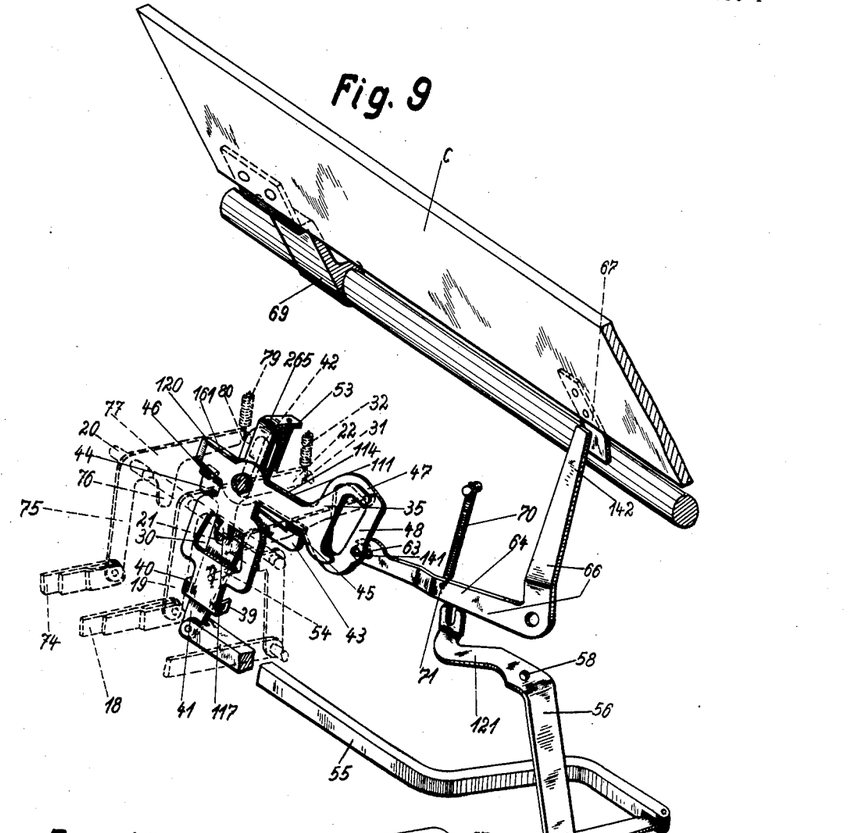
Fig. 9 is a view in perspective of parts of means for controlling the carriage under depression of the carriage advancing and retracting keys respectively.
Figure 10:
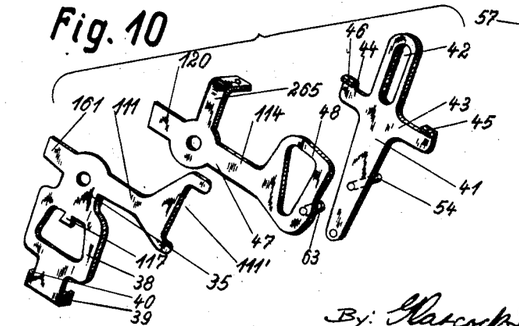
Fig. 10 is a similar view of details of said means.
Figure 12:
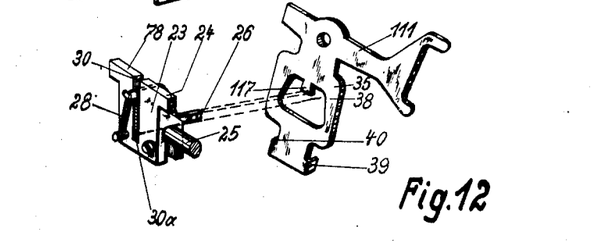
Fig. 12 is a similar view of said shaft and parts directly associated therewith.

Upon depression of said key 8 the arm 22 of the related bell crank 19, engages the arm 111 of lever 35 and swings the latter from normal position together with the levers 41 and 47 into the position shown in Figs. 2 and 9 whereby as will be understood the draw key 60 couples the gear 61 to sleeve 122 and thereby conditions the reverse gearing for right hand drive of the carriage. It will of course be understood that the key way 61a of the gear 61 is aligned with key way 122a of sleeve 122 in the normal position of the parts so that such coupling is possible. Simultaneously with movement of the lever 35 into the proper position the arm 161 thereof engages under the arm 77 of bell crank 75 and locks the key 7 against depression. During initial movement of the lever 35, and levers 41, 47, the locking lug 117 of lever 35 is moved to working position relative to the locking dog 26. Simultaneously with this action the lug 21 of bell crank 19 acts against the arm 24 of the member 23 (Figs. 11 and 12) and rocks the latter together with the shaft 25 in the clockwise direction (Fig. 12). The locking dog 26, which is yieldingly connected with said member 23 cannot participate in this rocking movement of the member 23, since it is in working position to the under edge of the lug 117. Consequently the spring 28 is hereby tensioned against said rocking movement of the parts 23 and 25. At the end of said rocking movement of the levers 35, 41 and 47 to condition the reverse gearing for right hand drive of the carriage the locking dog 26 snaps upwardly upon the right hand side of the lug 117 under the action of the tensioned spring 28 to lock said lever 35 and consequently the levers 41, 47 link 55, yoke 56 and draw key 60 against return during depression of said key 8.

The carriage C now moves to the right as long as said key 8 is held depressed. Considering the desired ease of manipulation of the machine, the pressure exerted upon the key by the operator for holding said key in depressed position is comparatively slight. Near the end of carriage run in said direction the tappet 69 engages the arm 142 of the bell crank 66 and returns the carriage controlled lever 47 to normal position. However at this point in the operation of the machine the sleeve 122 and draw key 60 have not yet rotated into a position in which the lug 59 on said draw key registers with the key way 143 in the left drive gear 62 so that setting of said draw key into a position to couple said gear to said sleeve and thereby condition the reverse gearing for left hand driving operation is blocked by said gear 62. To obviate jamming of the parts under this condition the before mentioned compensating movement is provided for between the lever 41 and levers 35 and 47. The lever 41 on swinging movement of lever 47 to normal position moves downwardly under pressure exerted against the lug 46 thereof by arm 128 of lever 47. The lever 41 is thus tensioned by the spring 53 so that as soon as the lug 59 of draw key 60 registers with the key way 143 of gear 62 the lever 41 under the tension of spring 53 is rocked on the fulcrum afforded by engagement with said arm 120 to condition the reverse gearing for left hand drive of the carriage C.

As an incident to return of the lever 47 to normal position the arm 114 thereof forces the bell crank 19 back into normal position by upward pressure against the arm 22 of said crank. This upward pressure is transmitted by means of the parts 18 and 12 to the depressed key 8 and is of such degree as to overcome any pressure exerted on the key by the operator. The carriage retracting key 8 is thus positively returned to normal position thereby breaking the locking relation of the lug 117 of lever 35 and the locking dog 26 so that said lever 35 is returned to normal position as an incident to such return of lever 41 thereby unlocking the carriage advancing key 7.

Coincidently with return of the carriage retracting key 8 the clutch control shaft 25 is released and rocked in a direction to swing the clutch tripping dog 84 back into tripping position by means of a spring 93 connected to said dog and to a lever 156 (Fig. 16) which forms no part per se of the present invention and need merely be identified in passing. Such rocking of the clutch control shaft 25 and dog 84 is contingent upon rotation of the clutch 86 through a complete revolution or in other words into full cycle position. As long as said clutch is out of full cycle position a comb 158 therein blocks swinging movement of said dog 84 back into tripping position in a manner fully described in my copending application previously noted.

As will be understood coincidentally with return of the clutch tripping dog 84 to tripping position the contacts 91, 92 are opened through return of the described contact controlling parts to normal position by the conjoint action of spring 93 and cam 106.

It should be mentioned at this point that in the event of single stroke operations of the key 8 the coacting locking lug 117 and dog 26 provide for locking the key down and the draw key 60 in properly set position to insure a complete cycle of operation of the drive and therefor a complete step of movement of the carriage C.

Regarding operation under control of the carriage advancing or left spacing key 7, the lug 76 of the related bell crank 75 bears against the arm 78 of crank member 23 and operates the clutch control shaft to swing the clutch shifting dog in the same manner as described with reference to key 8. Since the levers 41, 47, 35, link 55, yoke 56 and draw key 60 are normally set, by the spring 70 to condition the reverse gearing for left hand drive of the carriage no operation of these parts is required under depression of said key 7. Upon complete depression of the key 7 the arm 77 of the related bell crank 75 engages the arm 161 of the lever 35. The arm 111 of said lever in the normal position of the latter engages the under edge of the arm 22 of bell crank 19. Consequently the key 8 is locked against depression under depression of the key 7. The carriage C now steps to the left as long as the key 7 is held depressed. As the carriage approaches the end of its left hand run the tappet 67 thereon engages the bell crank 66 and swings the same together with the lever 47 into the position illustrated in Figs. 2 and 9. Up to this point the left drive gear 62, sleeve 122 and draw key 60 have not yet completed a full revolution and consequently the draw key lug 59 is blocked by the face of the right drive gear 61 from entering the keyway 61ᵃ thereof and thereby coupling said gear 61 to sleeve 122. As soon as this condition is obviated by complete rotation of the parts 62, 122, 59 the reverse gearing is conditioned for right hand drive of the carriage in a manner which will be clear without detailed description thereof. As an incident to swinging of the lever 47 the arm 120 thereof operates bell crank 77 to positively return key 7 and key 8 is unlocked as will be obvious. The clutch 86 is now disengaged and the motor contacts broken just as previously described.

Returning now to the pin gear 110 it will be noted that said gear is of the type embodying a pair of diametrically opposed pins 125, 126 operating in the interdental spaces of the rack 128 and normally disposed in a horizontal plane. In this form of rack and gear drive, the speed of movement of the carriage C through each step or increment of movement thereof varies under uniform driving speed of the motor, being slowest during substantially the first and fourth phase of revolution of said gear or during the arcs of movement of said pins represented in Fig. 8 at 136, 139 respectively. This together with other factors inherent in such rack gear drives, and well understood in the art, results in a non-uniform load being imposed on said gear and consequently on the carriage shift clutch 86 tending to cause a grabbing action between the clutch pawl 88 and ratchet member 90 particularly in the last phase of operation of said clutch. The result of this situation is that resistance to release of the pawl 88 or to tripping thereof increases in the final phase of rotation of the clutch. To obviate this difficulty spring 140ᵃ of the detent lever 140 sufficiently reactive against the pins 125 and 126 to boost the speed of the carriage in the final phase of each step of movement thereof slightly ahead of that of the drive shaft 5 thereby facilitating release or tripping of the pawl 88. As will be clear the detent lever 140 also prevents overthrow movement of said carriage C.

*Drive control in multiplication*

The machine of my previously noted application is equipped with means for performing multiplication in either direction of travel of the carriage C and including a multiplication control lever 232 settable in opposite directions respectively.

The carriage drive of the present application is controlled by said lever also. Only these parts of the said multiplication mechanism entering into such control will be described herein. For a detailed understanding of the complete mechanism reference may be had to said copending application.

The multiplication lever 232 (Fig. 13), in one setting thereof attained by swinging the same clockwise to the position as viewed in said figure, is retained in said set position by means of tensioned detent slide 232'. Such setting of lever 232 moves a connecting rod 52 and swings a bell crank 50 (Fig. 11) pivotally mounted on the shaft 20 clockwise as viewed in said figure. The bell crank 50 comprises a horizontally extending arm 49 projecting through the before mentioned yoke part 48 of lever 47 and also through a bifurcated extension 111' of lever 35. If the described reverse gearing is conditioned for left hand drive of the carriage C, under which condition it will be remembered the levers 35, 47, and 41 are swung in the opposite position to that illustrated in Fig. 9, said levers are then swung, by coaction of said bell crank arm 49 with said yoke and bifurcated extension into the correct position represented in Fig. 9 to condition the reverse gearing for right hand drive of the carriage.

Figure 13:
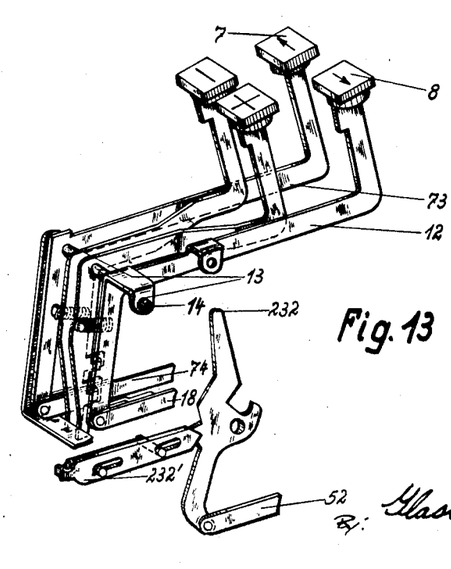
Fig. 13 is a view in perspective showing the arrangement of the multiplication controlling lever of the machine, connections between the same and the reverse gearing and also illustrating the carriage advancing and retracting keys in detail.
Figures 14, 15, 16:
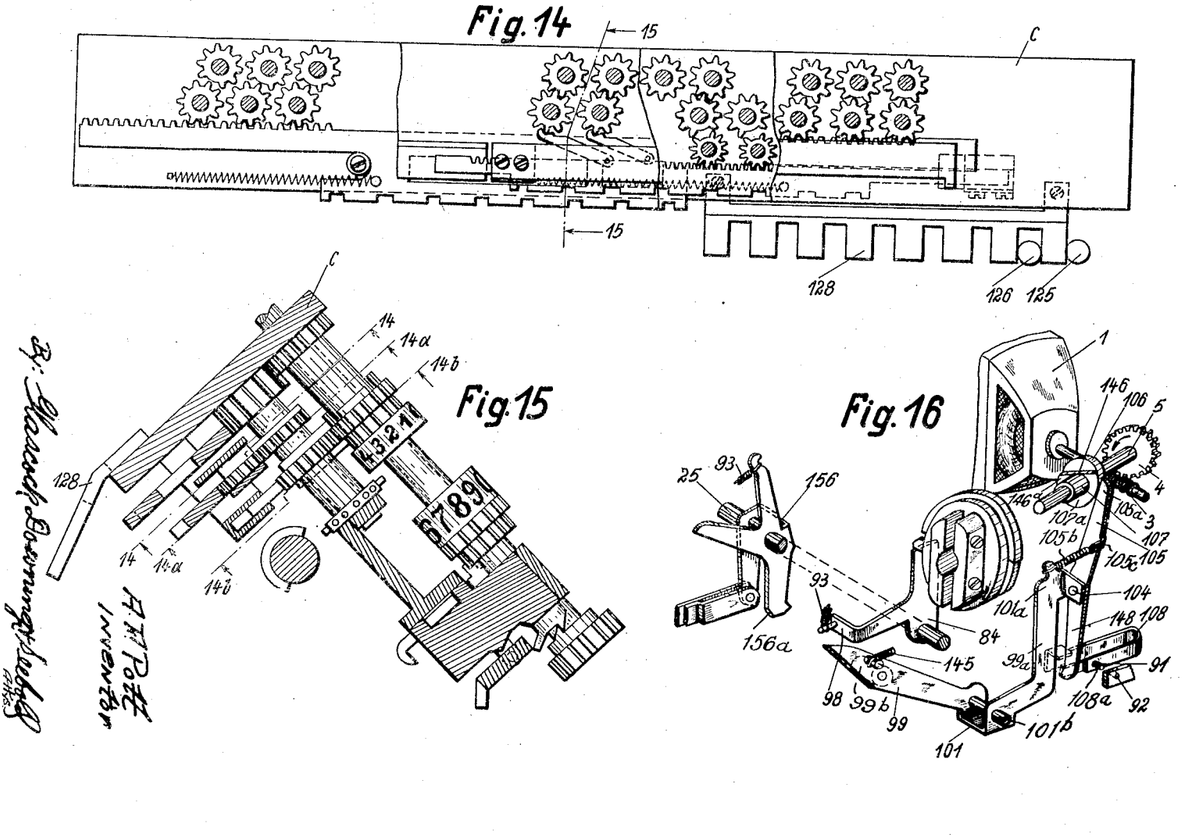
Fig. 14 is a view in longitudinal section of the carriage taken in different planes indicated by the lines 14—14, 14ª—14ª, 14ᵇ—14ᵇ of Fig. 15 and looking in the direction of the arrows.
Fig. 15 is a view in transverse section taken through the carriage along the line 15—15 of Fig. 14 looking in the direction indicated by the arrows.
Fig. 16 is a view in perspective illustrating the motor controlling mechanism.

Setting of the multiplication lever 232 in the opposite direction, i. e. counterclockwise as viewed in Fig. 13 swings the bell crank 50 counterclockwise as will be clear. Since the levers 35, 47, 41 are normally held in a position opposite to that represented in Fig. 9 by the spring 70 or in other words in left drive conditioning position the arm 49 of the bell crank 50 plays idly in the yoke part 48 and bifurcated extension. Obviously in the right hand drive conditioning position of the levers 35, 47, 41 and the first described setting of the multiplication lever 232 movement of said levers 35, 47, 41 into left hand drive conditioning position under the action of spring 70 may be controlled by said lever 232.

The foregoing is a detailed description of a preferred embodiment of my invention but it is to be understood that right is herein reserved to modifications in details described falling within the scope of the claims appended hereto.

What I claim is:

1. In a calculating machine, having a carriage, a shift mechanism for moving said carriage step by step, a motor drive, a reverse gearing between said carriage shift mechanism and said motor drive for controlling the direction of shift of said carriage, carriage advancing and retracting keys, and a settable member for conditioning said reverse gearing, the combination of a pivoted unit movable in opposite directions to return said keys to normal position, said unit including three relatively movable levers, the first lever of said unit being operatively connected with the settable member, the second lever of said unit being operable by one of the keys, the third lever being arranged intermediate the first and second levers for actuating the first lever under control of said carriage, and a yielding connection between the first and third levers.

2. In a calculating machine having a carriage, a shift mechanism for moving said carriage step by step, a motor drive, a reverse gearing between said carriage shift mechanism and said motor drive for controlling the direction of shift of said carriage, carriage advancing and retracting keys, and a settable member for conditioning said reverse gearing, the combination of a pivoted unit movable in opposite directions to return said keys to normal position, said unit including three relatively movable levers, the first lever of said unit being operatively connected with the settable member, the second lever of said unit having a lost motion connection with said first lever of the unit and being operable by one of said keys, the third lever being arranged intermediate the first and second levers for actuating the first lever under control of said carriage, and a yielding connection between the first and third levers.

3. In a calculating machine having a carriage, a shift mechanism for moving said carriage step by step, a motor drive, a reverse gearing between said carriage shift mechanism and said motor drive for controlling the direction of shift of said carriage, carriage advancing and retracting keys, the combination of a pivoted unit, a spring, said pivoted unit including a pivoted lever operable together with said unit under control of one of said keys and under the influence of said spring for conditioning said reverse gearing, and carriage operated means for moving said lever and said unit in opposite directions at the limits of advance and retraction of said carriage, said unit acting, under carriage operation of said lever, to return the depressed key to normal position.

4. In a calculating machine having a carriage, a carriage shift mechanism for moving said carriage step by step, a motor drive, a normally ineffective clutch for connecting said carriage shift mechanism with said motor drive, a reverse gearing between said carriage shift mechanism and said motor drive for controlling the direction of shift of said carriage, a carriage advancing key and a carriage retracting key, means for conditioning said clutch and operable by said keys, the combination of conditioning means for said reverse gearing, said reverse gearing conditioning means including a member movable in opposite directions to condition said reverse gearing in accordance with the selected direction of carriage shift, and members common to said reverse gearing conditioning means and said clutch conditioning means, said members being operable by said keys to move said movable member in one of said directions, said clutch conditioning means including a retaining member rendered operative upon actuation of said clutch conditioning means to retain said movable member in the position to which it is moved by said keys.

5. In a calculating machine having a carriage, a carriage shift mechanism for moving said carriage step by step, a motor drive, a reverse gearing between said carriage and said motor drive for controlling the direction of carriage shift, carriage advancing and retracting keys, the combination of a spring, a pivotally mounted unit for conditioning the reverse gearing for carriage advancing and retracting movements under the control of one of said keys, and automatically under the influence of said spring, and a carriage operated means connected with said unit and moved by said carriage at the limits of advance and retraction thereof, said spring being operable in the intermediate positions of said carriage to move said unit to such a position, to condition the reverse gearing to move the carriage in the advancing direction.

AUGUST FRIEDRICH POTT.